(12) United States Patent
Reitz (10) Patent No.: US 8,454,473 B2
(45) Date of Patent: Jun. 4, 2013

(54) TWO-SPEED TRANSMISSION AND METHOD FOR CONTROLLING A TWO-SPEED TRANSMISSION

(75) Inventor: Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/339,871

(22) Filed: Dec. 29, 2011

(65) Prior Publication Data
US 2012/0100957 A1    Apr. 26, 2012

Related U.S. Application Data

(63) Continuation of application No. PCT/DE2010/000693, filed on Jun. 17, 2010.

(30) Foreign Application Priority Data

Jul. 2, 2009  (DE) .......................... 10 2009 033 034

(51) Int. Cl.
| F16H 3/72 | (2006.01) |
| F16H 37/06 | (2006.01) |
| F16H 3/44 | (2006.01) |
| B60K 17/06 | (2006.01) |
| B60W 10/02 | (2006.01) |
| B60W 10/18 | (2006.01) |
| F16D 67/02 | (2006.01) |

(52) U.S. Cl.
USPC ................. 475/293; 475/4; 475/5; 475/317; 475/323; 180/369; 192/12 R; 192/14; 192/16

(58) Field of Classification Search
USPC ................ 475/4, 5, 293, 317, 320–322, 323, 475/326–329; 180/364, 369; 192/12 R, 13 R, 192/14, 15, 16
See application file for complete search history.

(56) References Cited

U.S. PATENT DOCUMENTS

| 2,588,187 A | * | 3/1952 | Weiser | 475/12 |
| 2,732,189 A | * | 1/1956 | Gerst | 366/60 |
| 2,870,655 A |   | 1/1959 | Rockwell |   |
| 3,022,683 A | * | 2/1962 | Simon | 475/276 |
| 3,308,686 A | * | 3/1967 | Magg et al. | 475/121 |
| 4,178,814 A |   | 12/1979 | Ahlen |   |
| 5,525,115 A | * | 6/1996 | Vanzini | 475/146 |
| 5,716,299 A |   | 2/1998 | Sommer |   |
| 5,846,153 A | * | 12/1998 | Matsuoka | 475/269 |
| 8,066,605 B2 | * | 11/2011 | Kingston et al. | 475/161 |
| 2007/0287575 A1 |   | 12/2007 | Hvolka et al. |   |
| 2010/0099533 A1 | * | 4/2010 | Horsfall et al. | 475/146 |

FOREIGN PATENT DOCUMENTS

| DE | 3908225 A1 | 9/1990 |
| DE | 19703241 A1 | 11/1997 |

(Continued)

*Primary Examiner* — Tisha Lewis
(74) *Attorney, Agent, or Firm* — Simpson & Simpson, PLLC (57) ABSTRACT

A two-speed transmission for transmitting a drive torque of a vehicle, having an input shaft drivable by a drive unit, a planetary gear system with sun gear, planet gears, planet carriers and ring gear and an output shaft, the sun gear having a rotationally fixed connection to the input shaft and the planet carrier having a rotationally fixed connection to the output shaft, and having a regulatable clutch system whereby the planet carrier can be fixed either relative to the input shaft or relative to the ring gear, and having an exclusively engageable and disengageable clutch system whereby the ring gear can be fixed relative to a housing that supports the planetary gear system.

8 Claims, 7 Drawing Sheets

FOREIGN PATENT DOCUMENTS

| | | |
|---|---|---|
| DE | 202004010051 U1 | 9/2004 |
| EP | 0391215 A2 | 10/1990 |
| EP | 1437534 A2 | 7/2004 |
| FR | 1318113 A * | 3/1962 |
| JP | 2003247623 A | 9/2003 |
| WO | 2010063735 A2 | 6/2010 |

* cited by examiner

TWO-SPEED TRANSMISSION AND METHOD FOR CONTROLLING A TWO-SPEED TRANSMISSION

CROSS-REFERENCE TO RELATED APPLICATIONS

This application is filed under 35 U.S.C. §120 and §365(c) as a continuation of International Patent Application No. PCT/DE2010/000693 filed Jun. 17, 2010, which application claims priority from German Patent Application No. DE 10 2009 033 034.8 filed Jul. 2, 2009, which applications are incorporated herein by reference in their entireties.

FIELD OF THE INVENTION

The present invention relates to a two-speed transmission, such as a two-speed planetary transmission, for a vehicle, preferably for use in a drive train for electric vehicles, in a drive train for hybrid vehicles or in an auxiliary drive train for hybrid vehicles.

The present invention also relates to a method for controlling a two-speed transmission, such as a two-speed planetary transmission, some other transmission having two clutches or a power-shift transmission, or for controlling a drive train having such a transmission.

BACKGROUND OF THE INVENTION

At the present time, drive trains used for electric vehicles are primarily single-speed transmissions, i.e., pure reduction stages having an output speed that is reduced in comparison to an input speed. However, with such a configuration the electric drive must cover the entire rotational speed range, which significantly reduces its overall efficiency. In addition, the realizable speed range is rather narrow.

It has therefore already been proposed to use two-speed transmissions as drive trains for electric vehicles, but up to now these have been configured as conventional manual transmissions with a sliding muff-type coupling. If such a transmission is used, the electric machine can be of smaller design, which results in a clear cost benefit. However, the very configuration of the transmission with a sliding muff-type coupling causes a drop in traction force during shifting. However, for automated drive trains such a drop in traction force means a substantial sacrifice of comfort, which is not acceptable to the customer.

SUMMARY OF THE INVENTION

It is therefore an object of the present invention to specify a two-speed transmission for transmitting a drive torque in a drive train of a vehicle, preferably for use in a drive train for electric vehicles, in a drive train for hybrid vehicles or in an auxiliary drive train for hybrid vehicles, whereby shifting without an interruption of traction force or shifting with reduced interruption of traction force (i.e., with partial replenishment of the drop in traction force), i.e., "load shifting" is enabled, even without using a double-clutch transmission with fully operational dual clutch having two automated and regulatable clutches.

This object is fulfilled according to the invention by a two-speed transmission for transmitting a drive torque of a vehicle, having an input shaft drivable by a drive unit, a planetary gear system with sun gear, planet gears, planet carriers and ring gear and an output shaft, the sun gear having a rotationally fixed connection to the input shaft and the planet carrier having a rotationally fixed connection to the output shaft, and having a regulatable clutch system whereby the planet carrier can be fixed either relative to the input shaft or relative to the ring gear, and having an exclusively engageable and disengageable clutch system whereby the ring gear can be fixed relative to a housing that supports the planetary gear system.

Accordingly, the two-speed transmission according to the invention comprises a combination of a "fully operational" regulatable clutch with an exclusively engageable and disengageable clutch, which may be constructed for example as a brake and consequently is not regulatable, i.e., as a 0/1 setting element is either completely disengaged or completely engaged. With this configuration, if the regulatable clutch system is engaged and the planet carrier is thereby fixed relative to the input shaft, then the planetary gear set is locked. This function is also achieved when the regulatable clutch system fixes the planet carrier relative to the ring gear.

The drive in this case may preferably be in the form of an electric machine, a rotor of the electric machine being connected to the input shaft. The electricity needed to operate the electric machine may be taken in this case from an energy storage unit (for example, a battery in the vehicle), or may be produced by an internal combustion engine in combination with a generator or a fuel cell.

According to an especially preferred exemplary embodiment, the regulatable clutch system is designed as a wet clutch with an inner plate carrier having at least one inner friction plate and an outer plate carrier having at least one outer friction plate.

In this case the inner plate carrier may be rotationally fixed to or formed on the input shaft and the outer plate carrier may be rotationally fixed to or formed on the planet carrier, so that the regulatable clutch system is able to fix the planet carrier relative to the input shaft. Alternatively, the inner plate carrier may be connected to or formed on the planet carrier, and the outer plate carrier may be connected to or formed on the ring gear.

Furthermore, the regulatable clutch system may include an actuating device with operating actuator and transmitting element, the transmitting element being rotationally fixed to one of the plate carriers, the operating actuator being braced against the housing that supports the planetary gear system, and there being an actuating bearing situated between transmitting element and operating actuator.

Furthermore, when the actuating mechanism is in the non-actuated state, the transmitting element is able to be preloaded by means of a preloading device into a positive contact with the housing supporting the planetary gear set, whereby the transmitting element forms part of a parking lock.

Furthermore, in a zero-function position the actuating mechanism is able to suspend the positive contact between housing and transmitting element and thereby suspend the parking lock, there not yet being any frictional contact between the plates of the clutch in this zero-function position, so that the regulatable clutch is designed to be disengaged in its normal state. If the regulatable clutch is disengaged in its normal state, then the positive contact of the parking lock is present when the clutch is in a disengaged state.

The engageable and disengageable clutch may be designed as an on/off setting element (for example using a solenoid switch), with which the ring gear may be fixed relative to the housing. In this case the engageable and disengageable clutch may be designed to be disengaged in its normal state. Because the engageable and disengageable clutch is disengaged when not electrified, and is not engaged until electricity is supplied to the actuator, the result is a secure non-electrified state with a torque-free transmission. Furthermore, the ring gear can be rotatably supported on the output shaft.

The present invention also teaches a method for operating a drive train of a vehicle with a two-speed transmission having the following features:

During operation of the drive train, the engageable and disengageable clutch remains engaged below a velocity threshold or engine load that is specifiable or adaptable to operating situations, so that a drive torque delivered by the drive is transmitted to the output shaft as a first gear, corresponding to the transmission ratio between sun gear and planet carrier, and upon reaching or above the velocity threshold or engine load the regulatable clutch is engaged, while the engageable and disengageable clutch is still engaged, whereby the drive torque is reduced within adaptable limits at the engageable and disengageable clutch, and the drive torque is subsequently transmitted to the output shaft as a second gear without a gear ratio change. The engageable and disengageable clutch will then be disengaged after the drive torque has been reduced within the adaptable limits.

With the method according to the invention, a control method is created whereby shifting under load is enabled without the use of the previously usual overlapping shifting.

Furthermore, when an electric motor is used as the drive in first gear, and when operating in second gear, power output can remain essentially constant, while power delivered by the drive is increased above this essentially constant power output during shifting from first to second gear. In this case the power delivered by the motor can be increased over a nominal torque of the electric motor. Furthermore, the mass inertia on the primary side, in particular the mass inertia of the electric machine, can be used to replenish the traction force during the rotational speed synchronization phase.

BRIEF DESCRIPTION OF THE DRAWINGS

The present invention will be explained in greater detail below on the basis of preferred exemplary embodiments, in combination with the pertinent figures. These show the following.

Figure 1:
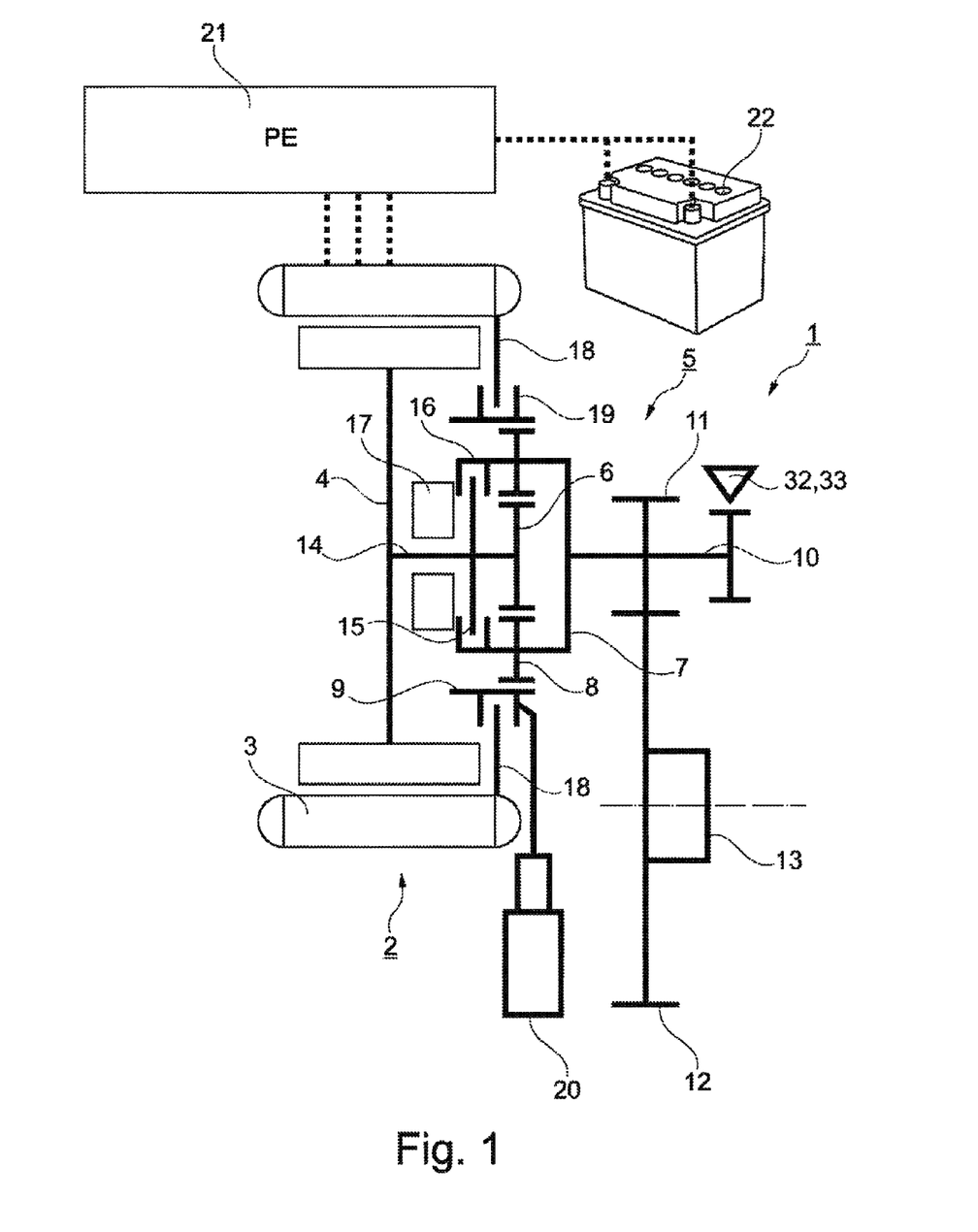
FIG. 1 is a schematic diagram of a first exemplary embodiment of a two-speed planetary transmission.

FIG. 1 depicts the construction principle of a first exemplary embodiment of the present two-speed planetary transmission, i.e., a transmission which is able to execute a shift without an interruption of traction force, or a shift with the drop in traction force largely reduced. The amount of reduction of the traction force replenishment provided depends ultimately on the assessment by the user of the vehicle, which can be taken into consideration when designing the shifting sequence.

Another advantage of the configuration presented below is that the requisite actuating system for the regulatable clutch simultaneously takes over the operation of the parking lock, which results in advantages for control and regulation, as well as simplifying the design and reducing the costs.

FIG. 1 shows in this case the interconnection of the components of drive train 1, namely electric motor 2 with stator 3 and rotor 4, two-speed planetary transmission 5 with sun gear 6, planet carrier 7, planet gears 8 and ring gear 9, output shaft 10, output gear 11 attached to this output shaft, gear wheel 12 that meshes with this output gear 11, differential 13, and parking lock 32, 33.

As may be seen from FIG. 1, situated between planet carrier 7 and an input shaft 14 is a regulatable (here: wet) clutch device having an inner plate carrier 15 (as one exemplary embodiment of an inner plate carrier) and an outer plate carrier 16 (as one exemplary embodiment of an outer plate carrier), as well as actuating device 17. The regulatable clutch is designed to be disengaged in a normal state (no-actuated state of the clutch), i.e., without frictional contact between the plates.

Through the action of actuating mechanism 17, friction plates of inner and outer plate carriers 15, 16 can be pressed into frictional contact with each other, whereby input shaft 14 is connectable to planet carrier 7.

A dry clutch mechanism could also be used, as an alternative to this.

As may also be seen from FIG. 1, an engageable and disengageable clutch 19 is situated between a housing 18, on which stator 3 of electric motor 2 is supported, among other things, and ring gear 9, where in the engaged state of engageable and disengageable clutch 19 housing 18 is connected to ring gear 9, and where in the disengaged state of engageable and disengageable clutch 19 ring gear 9 is freely rotatable relative to housing 18.

According to the preferred exemplary embodiment, engageable and disengageable clutch 19 is engaged in its normal state, and is disengaged by means of operating actuator 20. The reverse of this arrangement (clutch 19 disengaged in the normal state and engaging of the clutch by means of the operating actuator) is also conceivable, however.

A solenoid switch may be used for example as a possible operating actuator 20 (i.e., as a switchable setting element).

Stator 3 is supplied through the power electronics 21 with electricity from a storage device 22, for example, a high-power automobile battery.

Figure 2:
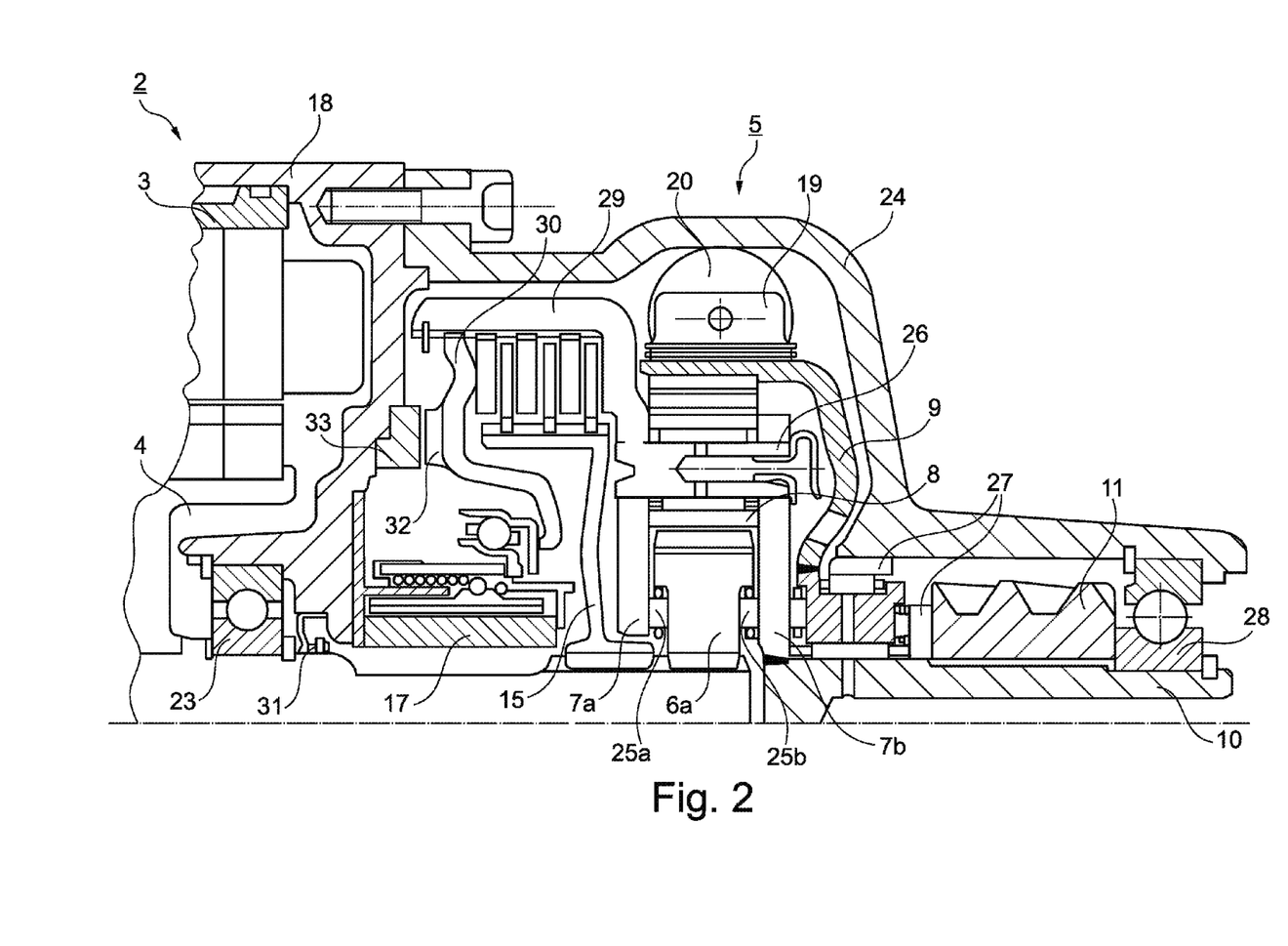
FIG. 2 is a half-sectional view of the two-speed planetary transmission according to FIG. 1.

In FIG. 2, the construction principle shown in FIG. 1 is converted to a concrete design as a possible exemplary embodiment.

Thus, FIG. 2 shows electric motor 2 with stator 3, which is attached to housing 18, and with rotor 4, which is connected to input shaft 14 and rotatably supported in housing 18 by means of bearing 23. The individual components of electric motor 2, as well as the tie-in to an energy storage element 22 via power electronics 21, are known. We will therefore dispense with detailed explanations in the following.

A clutch bell housing 24 is attached to housing 18 using threaded connections. Situated in the area delimited by housing 18 and transmission housing 24 are planetary transmissions 5, as well as regulatable clutch 15, 16 and engageable and disengageable clutch 19. The delimited area in the present case is a wet zone, since regulatable clutch 15, 16 is designed as a wet clutch.

Sun gear 6 of the planetary transmission is formed of a gearwheel 6A, which is rotationally fixed and supported by inner toothing on outer toothing of input shaft 14. In addition, gearwheel 6A is supported by means of thrust bearings 25A, 25B on both sides in planet carrier 7 with plate 7A on the motor side and plate 7B on the output side.

Plate 7A on the motor side and plate 7B on the output side are connected to each other by pins 26; these pins 26 rotatably support the planet gears 8, which mesh with gearwheel 6A, by means of needle bearings, bearing bushes, or similar supporting devices.

Planet gears 8 in turn mesh with ring gear 9, ring gear 9 being supported on output shaft 10 by means of a needle bearing or similar support. Furthermore, ring gear 9 is rotatably supported with respect to output-side disk 7B and with respect to output gear 11 by means of thrust bearings. Ring gear 9 is rotatably supported with respect to clutch bell housing 24 by means of an additional bearing, washers (shim disks 27) being provided radially and/or axially to compensate for tolerances.

Output shaft 10 is likewise supported in transmission bell 24 by means of a fixed bearing 28.

Drive-side disk 7A has a dish-shaped extension 29 in a radially outer area, which is designed as the outer plate carrier 16 of the wet clutch between planet carrier and input shaft 14. Corresponding to outer plate carrier 16, the wet clutch includes inner plate carrier 15, which is designed as a flange with teeth that mesh with input shaft 14.

The outer and inner friction plates are pressed into frictional contact with each other by a transmitting element 30 (normally also referred to as a "pressure pot").

A shifting of the transmitting element 30, which is of essentially rigid design in the present case (i.e., no change in power transmission occurs in conjunction with a lever ratio), is effected by means of actuating mechanism 17, which is designed as a spring clip actuator, as disclosed by the applicant for example in DE 100 33 649 A1, DE 10 2005 017 026 A1 and DE 10 2005 025 266 A1. This spring clip actuator may be operated for example electrically. Alternative designs of the spring clip actuator or other operating actuators (such as ramp disk actuators, lever actuators, rocker lever actuators, etc.) are also conceivable. However, the present spring clip actuator has especially favorable dimensions for installation at the location shown in FIG. 2.

Situated between ring gear 9 and transmission bell 24 is a braking device 19, which operates as an engageable and disengageable clutch.

Transmission bell 24 is sealed relative to housing 18 by means of a sealing device 31, which may be situated to the left or right of bearing 23 in the illustration according to FIG. 2. By means of this seal 31, the wet chamber with the regulatable clutch between the planet carrier and input shaft 14, and the engageable and disengageable clutch 19 between ring gear and clutch bell housing 24, are sealed with respect to the dry chamber, in which electric motor 2 is contained.

To lubricate the bearings used, bore holes are provided at various locations, as may be seen from FIG. 2, for example in the pins 26 to lubricate the bearings of planet gears 8. Also provided in output shaft 10 is a core hole in combination with radial bores, to lubricate the bearings for supporting ring gear 9.

Transmitting element 30 includes in addition one or more projections 32, which may be made to engage with corresponding recesses in housing 18, formed for example by means of the elements 33 attached to housing 18. In a zero function position of operating actuator 17, the transmitting element with the projections 32 is freely rotatable relative to housing 18, while at the same time there is not yet any frictional contact between the friction plates of the engageable and disengageable clutch. However, if the transmitting element is moved from this zero-function position further to the left in FIG. 2, the projections 32 come into contact with the recesses 33 in housing 18, whereby the transmitting element, and hence the pot-shaped component 29 functioning as outer plate carrier, which is connected to the transmitting element, will be fixed with respect to housing 18. This movement occurs in the present case when no electricity is being supplied to operating actuator 17. Since planet carrier 7 is firmly connected to output shaft 10, the output shaft is also fixed with respect to housing 18. This produces the possibility of locking the output shaft and creating a parking lock.

The parking lock is thus achieved by actuating device 17 being placed in its state free of actuating power; i.e., with the spring clip actuator used in the present case a non-electrified state exists. This brings the actuating slide to its rear stop position, and thereby brings the projections 32 into contact with the recesses 33.

By means of a "basic power application," transmitting element 30 is shifted to the right, starting from this rear stop position, which causes the parking lock to be suspended without there already being any contact between input shaft 14 and the planet carrier through the friction contact of the regulatable clutch. Accordingly, the zero-function position is set.

Thus, a first exemplary embodiment of a transmission is described above which has only one regulatable clutch. The second clutch on the other hand is designed as a brake, and is not intended to be regulatable; that is, it functions as a 0/1 setting element which can set only a completely disengaged or a completely engaged state.

Figure 3:
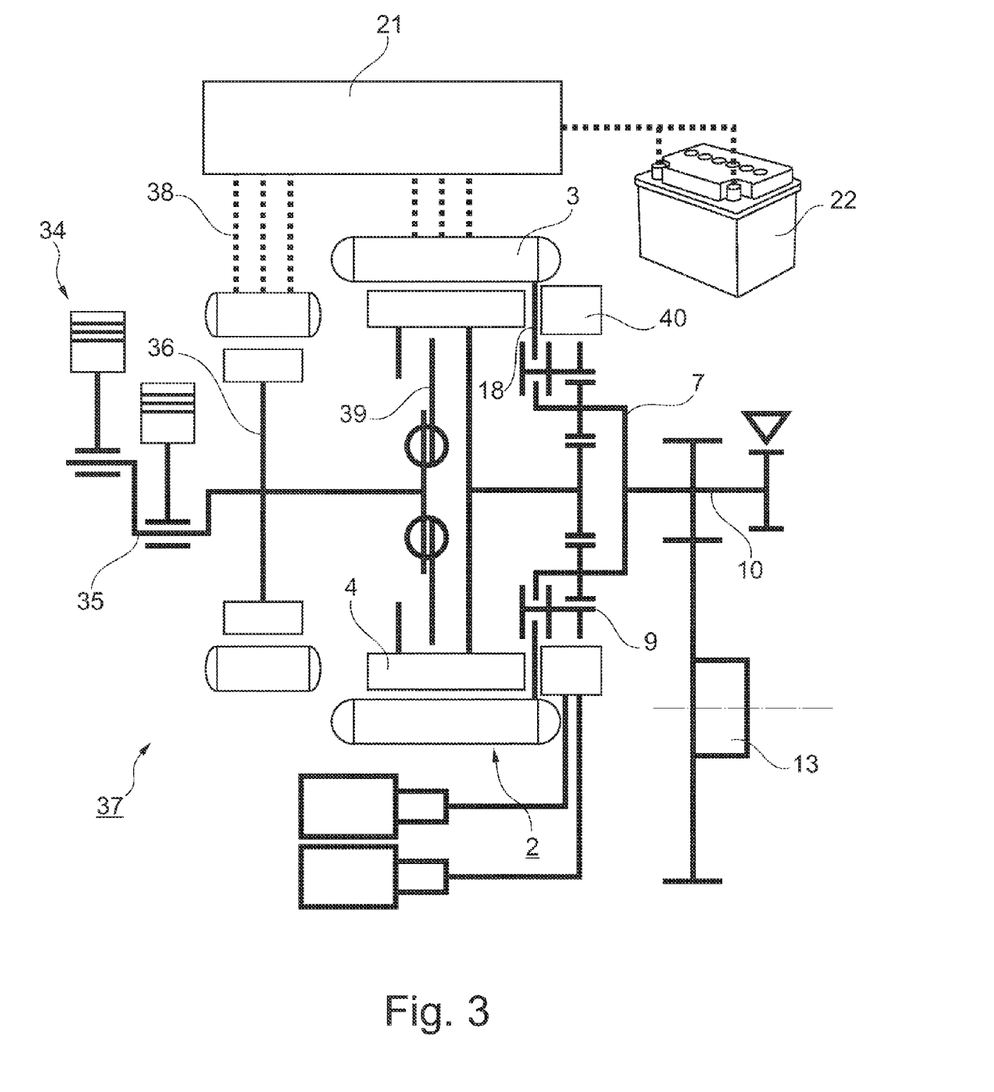
FIG. 3 is a schematic diagram of another exemplary embodiment of the two-speed planetary transmission.

The above-described preferred embodiment of the present two-speed planetary transmission, while preferred, should however not be understood as the only embodiment of the present invention. As an alternative embodiment, the depiction of principle according to FIG. 3 is specified, which illustrates the application of the present concept in a hybrid drive train. The hybrid drive train includes internal combustion engine 34, which preferably may be designed as a two-cylinder horizontally opposed engine. Crankshaft 35 of engine 34 is connected to a rotor 36 of a first electric machine 37, which may serve as a starter-generator for combustion engine 34. In this case, a stator 38 of electric motor 37 is connected to the power electronics 21. The rotor 36 of starter-generator 37 is connectable to rotor 4 of electric motor 2 by means of a coupling device (in the present case a "normal" separating clutch), having clutch plate 39, including pertinent actuating devices (which are not shown in detail in FIG. 3). Stator 3 in turn is connected via the power electronics 21 to an energy storage element 22 (symbolized by the battery according to FIG. 1 or 3).

Hence the exemplary embodiment according to FIG. 3 includes a separating clutch having clutch plate 39, whereby a connection is producible between combustion engine 34 and the rotor of electric machine 3.

In a manner comparable to the exemplary embodiment according to FIG. 1, the rotor of electric machine 3 is connected to a sun gear of the two-speed planetary transmission. The sun gear in turn meshes with planet gears, which are supported on a planet carrier 7. The planet gears mesh is addition with ring gear 9.

In the present exemplary embodiment according to FIG. 3, the regulatable clutch is provided between planet carrier and ring gear, in order to lock the planetary gear set. The engageable and disengageable clutch is provided between ring gear and housing. With this arrangement, both clutches can be engaged and disengaged or regulated by means of one actuating system 40.

To this end, on housing 18 is situated actuating device 40, with which planet carrier 7 is fixable with respect to the housing, and ring gear 9 is fixable with respect to the planet carrier. Planet carrier 7 in turn is firmly connected to output shaft 10, which is connected to a differential 13.

The other features correspond to the features discussed in connection with FIG. 1. Accordingly, they will not be repeated.

The shifting of the exemplary embodiments described above, i.e., of the electric vehicle drive according to FIG. 1 or of the hybrid drive according to FIG. 3, is accomplished by takeover of the torque present at the engageable and disengageable clutch by the regulatable clutch, until the torque at the non-regulatable clutch is reduced within adaptable limits. After that the engageable and disengageable clutch is disengaged, and subsequently, as the electric machine is regulated its speed is braked to the second gear speed by the generating action.

Figure 4:
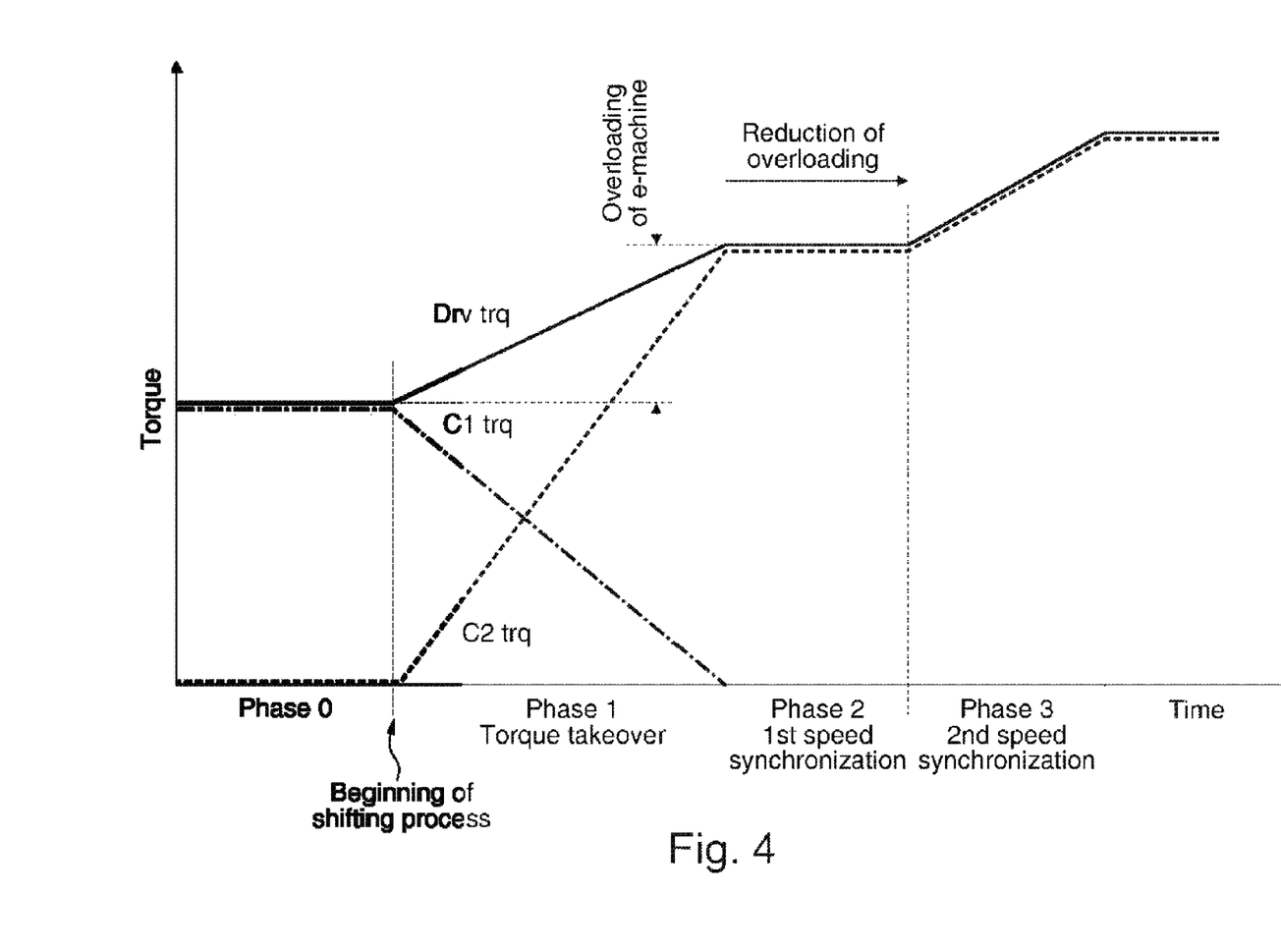
FIG. 4 is a depiction of an exemplary embodiment of a shifting sequence for a traction upshift, as a diagram of torque over time.

FIG. 4 depicts such a shifting process, whose principles are depicted in the Applicant's application DE 10 2005 037 515 for a parallel shift transmission. Hence a first phase of the shifting (i.e., the takeover of torque) may be seen from FIG. 4, in which the regulatable clutch assumes the torque of the drive from the regulatable clutch, which at this time is still engaged, by slipping (i.e., gradually). In FIG. 4 the regulatable clutch is designated as C2 and the engageable and disengageable clutch as C1, so that the dotted line C2 trq shows the torque at the regulatable clutch starting from the beginning of the shifting process, and the dash-dotted line C1 trq shows the torque present at the engageable and disengageable clutch.

As may be seen from this depiction according to FIG. 4, clutch C2 takes over the torque of the drive while slipping and guides it directly via the planet carrier to the differential stage. If the drive torque of the drive were not increased during this first phase, the result would be a drop in torque by the height of the gear spread between the two gear stages of the two-speed planetary transmission. In order to reduce this drop or completely prevent it, simultaneously with the above-named takeover of torque from the engageable and disengageable clutch to the regulatable clutch the electric machine is brought to an overload condition. This overload is apparent in FIG. 4 on the basis of the curve Dry trq and the Overload designation of the electric machine. The height of the particular overload is dependent on the chosen comfort conditions, as well as the maximum overload capacity of the electrical system, and can be from 0 to 100%.

After the complete takeover by regulatable clutch C2, engageable and disengageable clutch C1 becomes load-free and accordingly is disengaged. Next in phase 2 (first rotational speed synchronization), with the drive torque kept constant, the speed of the electric machine is reduced, and the overload and slippage at regulatable clutch C2 are thereby reduced. This process is also visible in conjunction with FIG. 5, where the torque/speed pattern in Phase 1 with the increase in torque at constant rotational speed, and then the decrease in speed at constant torque, are evident on the basis of the arrows shown.

If the speed of the electric machine is reduced far enough so that the overload is eliminated (in FIG. 5 the equilibrium curve for the particular electric drive has again been reached), in Phase 3 the further reduction of slippage takes place at the regulatable clutch C2 along the line of continuous output (power hyperbola) of the electric machine.

In the present case, a two-speed load-shifting planetary transmission is accordingly disclosed, where an electric drive acts on the sun gear and where the ring gear is shiftably fixable relative to a housing by means of a zero/one setting element, and where the planet carrier of the planetary transmission is connected to the output and is connectable to the sun gear via a regulatable clutch. In the present case, the actuating lever of the regulatable clutch is part of the parking lock; after deselection of selector position P the actuator is first moved to its zero-function position; that is, it will activate the parking lock by running back beyond this zero position. In the present case, this process is carried out without electricity. To this end, the regulatable clutch is disengaged in the state without actuating power, and is pushed open actively by a spring. Furthermore, the actuator is not designed to be self-arresting.

Figure 6:
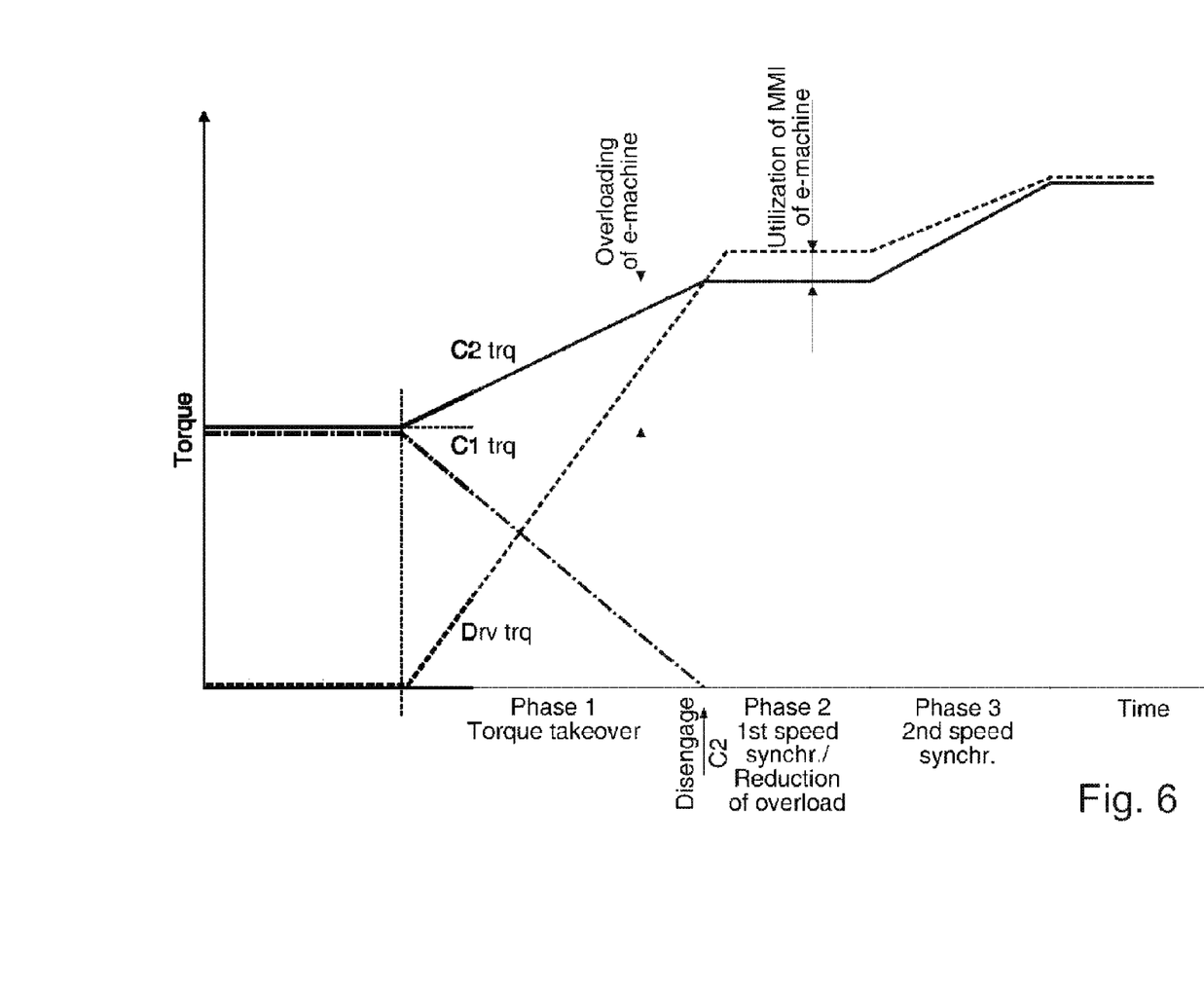
FIG. 6 is a depiction of another exemplary embodiment of the shifting sequence for a traction upshift, as a diagram of torque over time; and, FIG. 7 is a schematic diagram of a two-speed transmission with "fully operational" double clutch, with which the shifting sequences according to FIGS. 4 through 6 are also executable.

FIG. 6 depicts another exemplary embodiment for traction upshifting according to the invention, where in the first phase of the shifting C2 takes over the torque of the drive while slipping, and where C2 guides the transferred torque directly via the planet carrier to the differential stage. If the drive torque is not increased during this phase, then the result is a drop in traction power by the height of the gear spread. In order to reduce this drop, the electric machine is brought to an overload parallel to the above-stated transfer of torque. The height of the overload is dependent on comfort conditions, as well as the maximum overload capacity of the electrical system, and can be 0-100%. After the complete takeover by C2, C1 becomes load-free and is disengaged. Next in Phase 2 (first rotational speed synchronization), with the drive torque constant, the speed of the electric machine is reduced, and the overload and slippage at C2 are thereby reduced. To that end, the torque may be increased by C1 above the drive torque, by the mass moment of inertia (MMI) of the electric machine for additional propulsion. Under some circumstances, this MMI influence may go so far at low drive torques that the torque of the electric machine must be reduced during the speed adjustment. If the speed of the electric machine is reduced far enough so that the overload is eliminated, in Phase 3 the further reduction of slippage takes place at C2 along the line of continuous output (power hyperbola) of the electric machine.

A drop in traction force can also be prevented or reduced with a double-clutch transmission or an uninterrupted automated shift transmission ("UST"), since due to the overlapping shifting possible with such a double-clutch transmission a continuous transmission of traction force is made possible.

Figure 7:
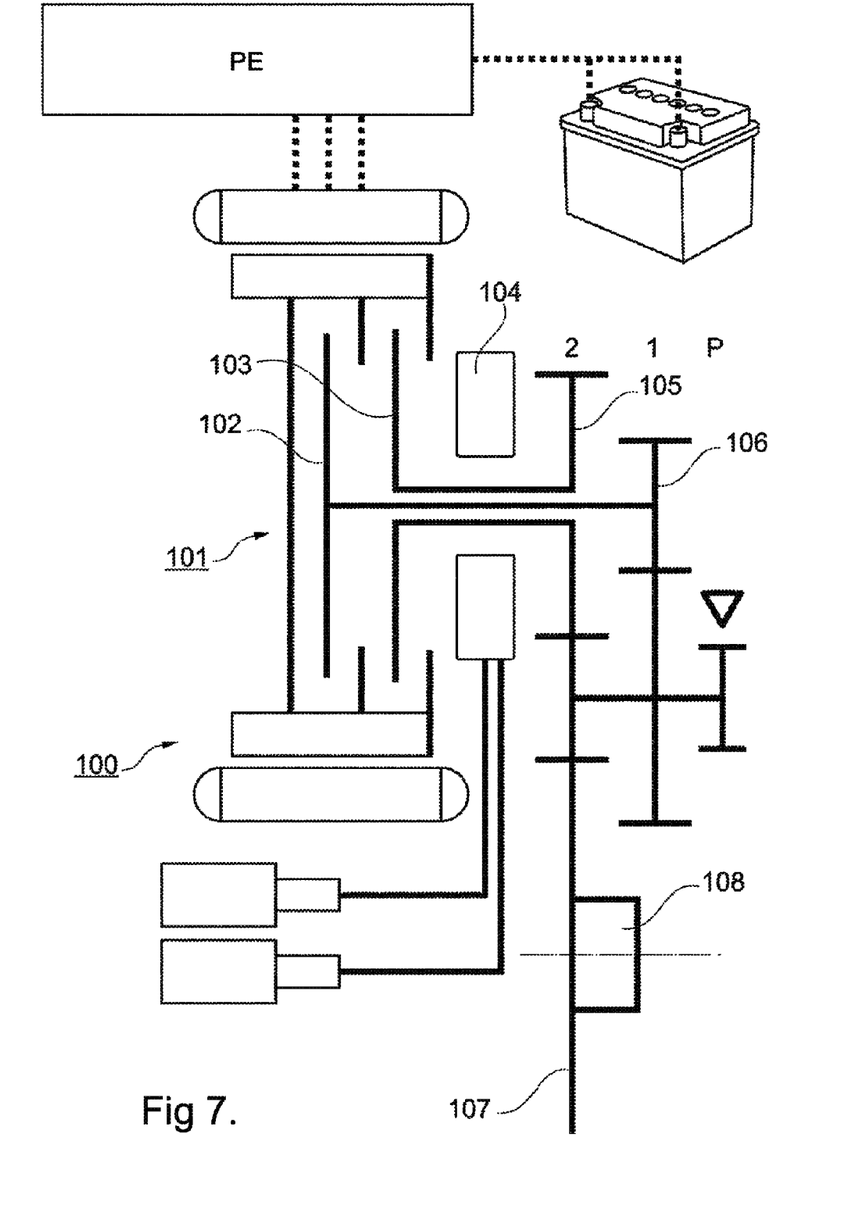

FIG. 7 depicts a possible configuration, with an electric drive 100, a double clutch 101 having two regulatable clutches with first and second clutch plates 102 and 103, an actuating system 104 having two actuating devices operable separately from each other for the clutches, a two-speed transmission having a first gear step 105 which is connected to second clutch plate 103 and having a second gear step 106 which is connected to first clutch plate 102, and having a drive 107 with differential 108. A spur gear system with spur gear pairs as the first and second gear steps may be used for example as the transmission.

Figure 5:
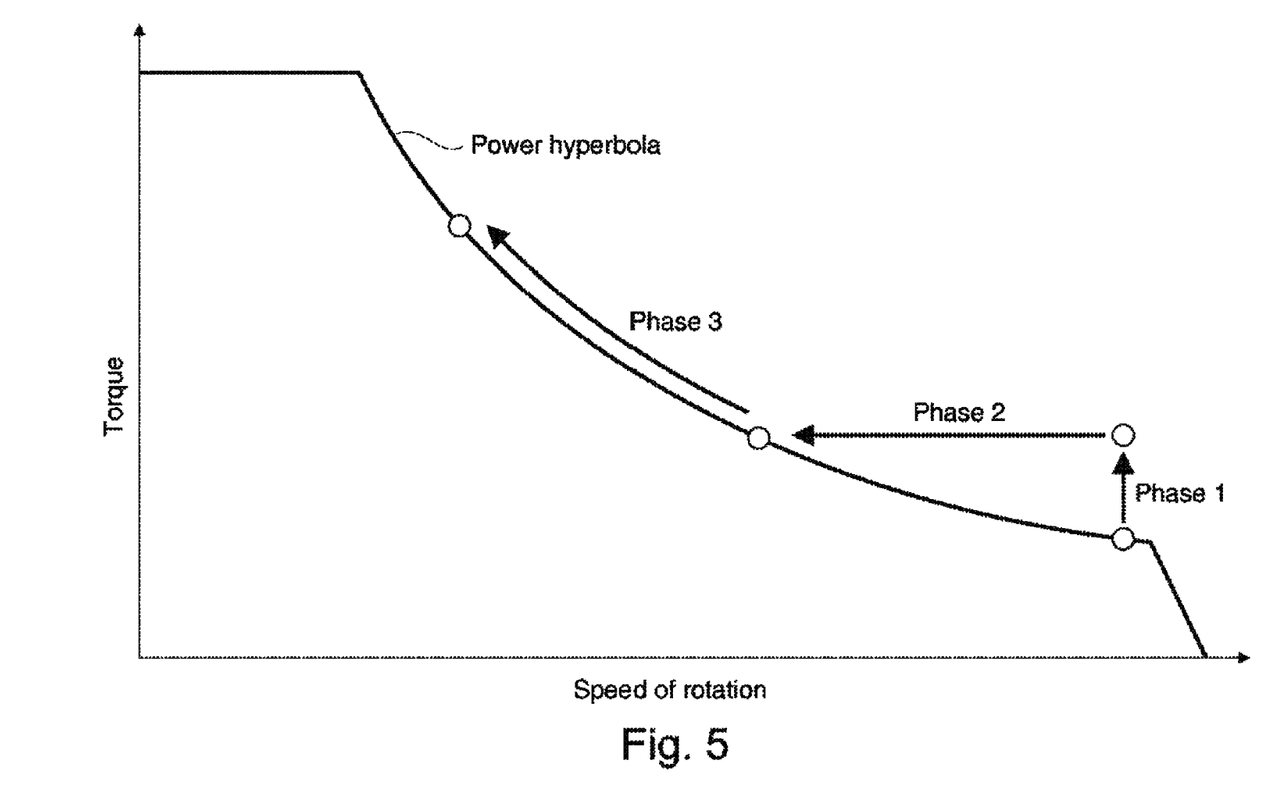
FIG. 5 is a depiction of the shifting sequence according to FIG. 4 in the electric machine characteristic map of torque over rotational speed.

The shifting sequences according to FIGS. 4 through 6 are also executable using the two-speed transmission with "fully operational" double clutch. In that case one of the clutches is operated as a regulatable clutch, and the other as an engageable and disengageable clutch.

Granted, such a power train having a double-clutch transmission and a "fully-operational" double clutch comprises two automated and separately regulatable clutches, each of which is connected to one of the subtransmissions and each of which must be operated by mutually independent actuating devices, which results in a comparatively complex configuration combined with high costs; however, the changed shifting sequence brings a gain in time specifically in traction upshifting. But a higher shifting speed reduces the maximum drop in traction force that must be compensated for, and at the same time increases the comfort of the shifting sequence.

Reference Labels
1 two-speed power-shift transmission
2 electric motor
3 stator
4 rotor
5 planetary transmission
6 sun gear
6A gearwheel
7 planet carrier
7A motor-side plate
7B output-side plate
8 planet gears
9 ring gear
10 output shaft
11 output gear
12 gear wheel
14 input shaft
15 inner plate carrier
16 outer plate carrier
17 actuating device
18 housing
19 engageable and disengageable clutch
20 velocity sensor
21 power electronics
22 storage device
23 bearing
24 transmission bell
25A thrust bearing
25B thrust bearing
26 pins
27 shim disk
30 transmitting element
31 seal
34 combustion engine
36 rotor
37 electric machine
38 stator
39 clutch plate
40 actuating device

What is claimed is:

1. A two-speed transmission for transmitting a drive torque of a vehicle, having an input shaft drivable by a drive unit, a planetary gear system with sun gear, planet gears, planet carriers and ring gear and an output shaft, the sun gear having a rotationally fixed connection to the input shaft and the planet carrier having a rotationally fixed connection to the output shaft, and having a regulatable clutch system whereby the planet carrier can be fixed either relative to the input shaft or relative to the ring gear, and having an exclusively engageable and disengageable clutch system whereby the ring gear can be fixed relative to a housing that supports the planetary gear system, wherein:

the regulatable clutch device is designed as a wet clutch with an inner plate carrier having at least one inner friction plate and an outer plate carrier having at least one outer friction plate:

the inner plate carrier being connected to the input shaft in a rotationally fixed connection or integrally formed therewith and the outer plate carrier being connected to the planet carrier in a rotationally fixed connection or integrally formed therewith; or the inner plate carrier has a rotationally fixed connection with or is integrally formed with the planet carrier and the outer plate carrier has a rotationally fixed connection with or is integrally formed with the ring gear;

the regulatable clutch device includes an activating device with operating actuator and transmitting element;

the transmitting element is connected to one of the inner or outer plate carriers;

the operating actuator is supported on the housing; an actuating bearing is situated between the transmitting element and the operating actuator; and, the operating actuator is rotatable with respect to the transmitting element.

2. The two-speed transmission according to claim 1, wherein the drive is an electric machine, and wherein a rotor of the electric machine is connected to the input shaft.

3. The two-speed transmission according to claim 1, wherein the transmitting element is preloaded in a positive contact with the housing by means of a preloading device when an actuating mechanism is in the non-actuated state, whereby the transmitting element is in the form of a part of a parking lock.

4. The two-speed transmission according to claim 3, wherein the actuating mechanism, in a zero-function position, suspends the positive contact between housing and transmitting element, and with the parking lock.

5. The two-speed transmission according to claim 1, wherein the regulatable clutch is designed to be disengaged in its normal state, and there is not yet any frictional contact between the plates in a zero-function position.

6. The two-speed transmission according to claim 1, wherein the engageable and disengageable clutch is designed as an on/off setting element with which the ring gear is fixable with respect to the housing, the engageable and disengageable clutch being designed to be disengaged in its normal state.

7. The two-speed transmission according to claim 1, wherein the ring gear is rotatably supported on the output shaft.

8. A two-speed transmission, comprising:
a housing;
an input shaft drivable by a drive unit;
an output shaft;
a planetary gear system with:
sun gear rotationally fixed connection to the input shaft;
a plurality of planet gears;
a planet carrier rotationally fixed to the output shaft; and
a ring gear;
one only single first clutch including one only single transmitting element displaceable to non-rotationally connect the planet carrier to:
the input shaft for a first position of the transmitting element; and
the housing for a second position of the transmitting element; and
a second clutch operable to non-rotationally connect the ring gear to the housing.

* * * * *